United States Patent
Subra Girish

(10) Patent No.: US 11,362,808 B2
(45) Date of Patent: Jun. 14, 2022

(54) METHOD AND SYSTEM FOR CONSENSUS IN A PERMISSIONED BLOCKCHAIN

(71) Applicant: Sasken Technologies Ltd, Bengaluru (IN)

(72) Inventor: Banavathi Venkata Subra Girish, Bengaluru (IN)

(73) Assignee: SASKEN TECHNOLOGIES LTD, Bengaluru (IN)

( * ) Notice: Subject to any disclaimer, the term of this patent is extended or adjusted under 35 U.S.C. 154(b) by 197 days.

(21) Appl. No.: 16/904,329

(22) Filed: Jun. 17, 2020

(65) Prior Publication Data

US 2021/0176041 A1 Jun. 10, 2021

(30) Foreign Application Priority Data

Dec. 6, 2019 (IN) .............................. 201941050462

(51) Int. Cl.
*H04L 29/06* (2006.01)
*H04L 9/06* (2006.01)
*H04L 9/32* (2006.01)

(52) U.S. Cl.
CPC .......... *H04L 9/0637* (2013.01); *H04L 9/0643* (2013.01); *H04L 9/3247* (2013.01); *H04L 2209/38* (2013.01)

(58) Field of Classification Search
CPC ... H04L 9/0637; H04L 9/0643; H04L 9/3247; H04L 2209/38
See application file for complete search history.

(56) References Cited

U.S. PATENT DOCUMENTS

| | | | |
|---|---|---|---|
| 11,243,943 B2* | 2/2022 | Bartolucci | H04L 9/085 |
| 2017/0300627 A1* | 10/2017 | Giordano | G06F 21/6245 |
| 2018/0349879 A1* | 12/2018 | High | H04L 9/3236 |
| 2019/0207751 A1* | 7/2019 | Harvey | H04L 9/0637 |
| 2019/0251199 A1* | 8/2019 | Klianev | G06F 11/1438 |
| 2019/0340269 A1* | 11/2019 | Biernat | G06F 16/27 |
| 2020/0026785 A1* | 1/2020 | Patangia | H04L 9/0643 |
| 2020/0118096 A1* | 4/2020 | Yang | H04L 9/3239 |
| 2020/0125269 A1* | 4/2020 | Karame | G06F 3/067 |
| 2020/0167770 A1* | 5/2020 | Kurian | G06Q 20/24 |
| 2020/0211024 A1* | 7/2020 | Li | G06Q 20/18 |

* cited by examiner

*Primary Examiner* — Ghodrat Jamshidi

(57) ABSTRACT

A method for consensus for creating new blocks in a blockchain is disclosed. A random timeout message is sent, by each node to each other peer privileged nodes participating in creating new blocks. Each privileged node computes a first wait time comprising a random timeout value and a random nonce from each of the random timeout message it receives. The first n timeout values from the lowest to the highest, n being equal to two-thirds the total privileged nodes are chosen and indexed. The timeout value at the computed triggers a timer. The node to time out first reveals all the random timeout messages received from its peers and sends the new block. Each peer privileged node validates the signatures of each random timeout message, calculates the timeout value and validates the first timeout. If successful, the new block is accepted and appended to the blockchain.

14 Claims, 13 Drawing Sheets

METHOD AND SYSTEM FOR CONSENSUS IN A PERMISSIONED BLOCKCHAIN

TECHNICAL FIELD

The present disclosure generally relates to blockchain consensus. More precisely, the present disclosure relates to a consensus method for creating new blocks in a permissioned blockchain. The present disclosure is based on, and claims priority from Indian application 201941050462 filed on 6 Dec. 2019, the disclosure of which is incorporated by reference herein.

BACKGROUND

Consensus is a mechanism for blockchain nodes to create and agree on a new block to be appended to the blockchain in a secure manner Here, secure means immunity against malicious attacks on the system. Internal faults and attacks are prevented by consensus methods with the reasonable assumption that a minimum number of honest nodes are present. For example, two thirds of the nodes are assumed to be honest and non-faulty in BFT (Byzantine Fault Tolerant) methods.

In a permissioned blockchain where the nodes in the blockchain network are authenticated, the consensus methods are much simpler and computationally more efficient than proof-of-work kind of consensus used in permissionless blockchains.

There are several existing consensus methods for permissioned blockchains. The consensus method called Proof-of-Elapsed-Time (PoET) is simple and efficient. But it requires using specialized hardware for generating a timeout period, signing, and verifying digital signatures. This also necessitates trusting a third party that is counter-intuitive to the concept of decentralization inherent to blockchain and severely limits the use of the consensus method.

Another consensus method called PBFT (Practical Byzantine Fault Tolerant) consensus involves multiple rounds of message exchanges between all the participating nodes. This method has the disadvantage of a high overhead of message processing.

In yet another consensus method called Raft, a leader is elected and only the leader appends blocks and the followers accept the blocks. This does not address the problem of byzantine behaviour of the nodes and the leader is always assumed to be honest. In several existing methods employing an elected leader for one or more number of blocks, if a leader loses network connectivity, the network must start the process of electing a leader again after waiting for a predefined time. This may lead to a loss of service during that period.

SUMMARY

This summary is provided to introduce a selection of concepts in simple manners that are further described in the detailed description of the disclosure. This summary is not intended to identify key or essential inventive concepts of the subject matter nor is it intended to determine the scope of the disclosure.

To overcome at least some of the problems mentioned above, a system and a method that provides a secure consensus method in a permissioned blockchain protocol and does not have a high computational overhead is needed. A method that has an improved tolerance to network partitioning when up to one third of the total number of nodes have network failure and cannot communicate with the other nodes and the remaining two thirds of the total number of nodes can continue with the consensus method without any adverse effects, is needed.

Briefly, according to an exemplary embodiment, a method for appending a new block to a blockchain in a permissioned blockchain is disclosed. The method includes sending a plurality of first messages by each of a designated plurality of privileged nodes, individually, to each of the other privileged nodes of the plurality of privileged nodes. The contents of each of the first messages are calculated using a first predefined method. The method includes computing a first wait time based on the plurality of first messages received, by each of the plurality of privileged nodes using a second predefined method. A timer, which is set to the computed first wait time, is initiated. The method includes creating and broadcasting a timeout reveal message to all the other privileged nodes and creating the new block for appending to the permissioned blockchain by the privileged node whose timer times out before the timers of the other privileged nodes time out. The method includes computing a second wait time using the second predefined method by each of the privileged nodes receiving the timeout reveal message. The method includes validating the first wait time with the second wait time, by each of the other privileged nodes. The method includes appending the new block created to its own copy of the block chain, provided the second wait time is substantially the same as the time waited for by the privileged node that broadcasted the timeout reveal message after previous block was created.

The summary above is illustrative only and is not intended to be in any way limiting. Further aspects, exemplary embodiments, and features will become apparent by reference to the drawings and the following detailed description.

BRIEF DESCRIPTION OF THE FIGURES

These and other features, aspects, and advantages of the exemplary embodiments can be better understood when the following detailed description is read with reference to the accompanying drawings in which like characters represent like parts throughout the drawings, wherein.

Figure 1:
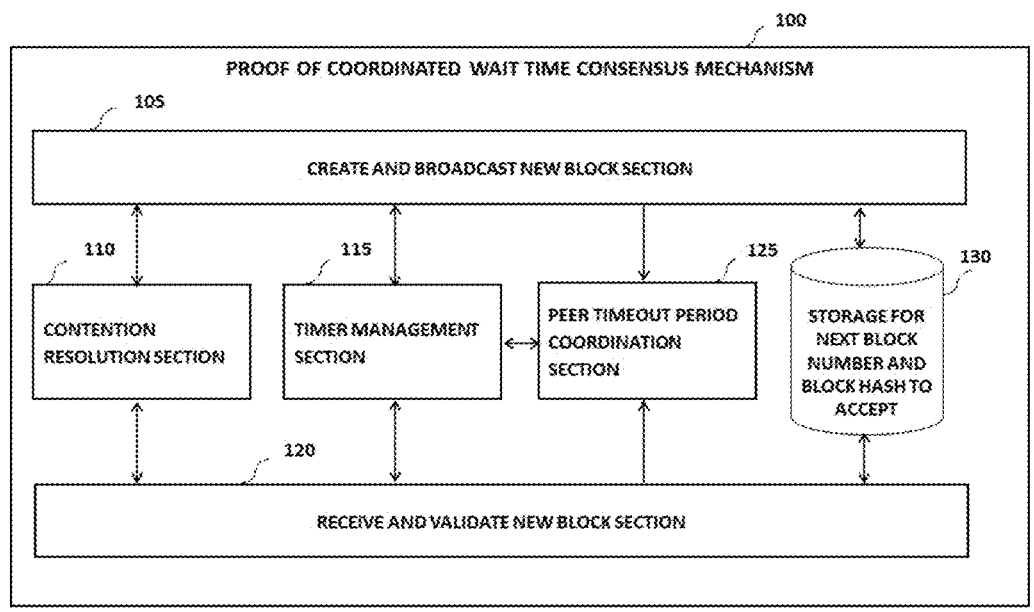
FIG. 1 is a system illustrating a mechanism for proof-of-coordinated-wait-time consensus, present in each of a privileged node in a permissioned blockchain network, in accordance with one embodiment of the present disclosure.

Further, skilled artisans will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those of ordinary skill in the art having the benefit of the description herein.

DETAILED DESCRIPTION

For the purpose of promoting an understanding of the principles of the invention, reference will now be made to the embodiments illustrated in the figures and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

The terms "comprises", "comprising", or any other variations thereof, are intended to cover a non-exclusive inclusion, such that a process or method that comprises a list of steps does not comprise only those steps but may comprise other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this invention belongs. The system, methods, and examples provided herein are illustrative only and not intended to be limiting.

In addition to the illustrative aspects, exemplary embodiments, and features described above, further aspects, exemplary embodiments of the present disclosure will become apparent by reference to the drawings and the following detailed description.

Embodiments of the present disclosure relates to a method for consensus in a permissioned blockchain protocol. As known in art, permissioned blockchain networks allows the network to appoint a group of participants (for example, nodes) from the network, who have the express authority to provide the validation of blocks of transactions. Unlike the public blockchains, the consensus methods in a private, or permissioned blockchain is designed for a specific business purpose where the counterparties are known. To achieve consensus, the data posted to the blockchain network must be verified in an automated manner by the relevant parties (nodes) to the transaction.

Embodiments of the present disclosure provide a method that has an improved tolerance to network partitioning, when up to one third of the total number of nodes have network failure and cannot communicate with the other nodes and the remaining two thirds of the total number of nodes can continue with the consensus method, without any adverse effects. In the present disclosure, for each block, the sequence of possible leaders in the blockchain network exists, but is not known to any node, including the current leader node at any given time. Thus, if the current leader fails, the leader next in sequence shall create the block.

The present disclosure discloses a method that may also be less susceptible to denial-of-service (DoS) attacks. Since the creator of the block (current leader for a block) is non-deterministic, that is, it cannot be predicted a priori, unless and until the block is created, the probability of successful denial-of-service attacks against the block creator is very low.

The present disclosure relates to a method of reaching consensus for appending a new block to the blockchain such that all the nodes in the blockchain network have identical copies of a given block in the blockchain.

The authentication, authorization, addition or deletion of a blockchain node to or from the list of privileged nodes can be done with various known mechanisms in the art. It is assumed that each of the privileged nodes has the prior information with respect to: the identity of all its peer privileged nodes, digital signature public key, digital signature public encryption key or (EC)DH public key. Further, each privileged node of the network, is in a position to establish a symmetric key with each of the peer privileged nodes using any of the existing mechanisms as known in art, that may include ECDH key exchange or encrypting the symmetric key generated on one of the nodes with its peer's public asymmetric encryption key. In the preferred embodiment, the digital certificate of each of the nodes is itself present in the blockchain, so that every node in the permissioned blockchain network can be used as trusted information. The information in the digital certificate in the preferred embodiment includes the node identifier, ECDSA public key, ECDH public key for establishing symmetric keys between peer nodes.

In some embodiments, the word 'node', 'privileged nodes', and 'participants' used in the description may refer to the network node in a permissioned blockchain and are synonyms, in this context and may be used interchangeably.

Embodiments of the present invention will be described below in detail with reference to the accompanying figures.

In some embodiments, the word 'privileged nodes', 'nodes' used in the description are referred to as (N1, N2, N3, N . . . Nn), or by 'N" are synonyms, in this context and may be used interchangeably.

In some embodiments, the word 'first message', 'random timeout message' used in the description are referred to as ((N1-2, N1-3, N1- . . . N1-$n$), (N2-1, N2-3, N2- . . . N2-$n$), . . . (Nn-1, Nn-2, Nn- . . . Nn-(n-1))), are synonyms, in this context and may be used interchangeably.

In some embodiments, the word 'first wait time', 'least timeout value' used in the description are referred to as (WT1, WT2, WT . . . WTn), are synonyms, in this context and may be used interchangeably.

In some embodiments, the word 'timer', 'block creation timer' used in the description are referred to as (T1, T2, T . . . , Tn), are synonyms, in this context and may be used interchangeably.

In some embodiments, the privileged node, whose timer times out before the timers of the other privileged nodes is referred to as privileged node N2, node 'm', node 'n', privileged node creating a new block, are synonyms, in this context and may be used interchangeably.

In some embodiments, each of the privileged nodes (N1, (no N2), N3, . . . Nn) receiving the timeout reveal message (TORM) are also referred as the peer privileged node in the description. For the purposes of explanation, it has been assumed that N2 is the node whose timer has timed out before the timers of the other nodes have timed out and N2 creates the new block. Hence (no N2) has been included in the list of nodes in parenthesis.

FIG. 1 is a system 100 illustrating a mechanism for proof-of-coordinated-wait-time consensus, present in each of a privileged node in a permissioned blockchain network, in accordance with one embodiment of the present disclosure. Referring to FIG. 1, the step of creating and broadcasting a new block is shown by reference numeral 105. Further to this step of 105, a contention resolution section 110, a timer management section 115, a peer timeout value coordination section 125 are activated. A storage space 130 for a next block number and block hash for acceptance is created after the step of 105. The step 120 illustrates the step of receiving and validating a new block section. Each step as shown in FIG. 1 is described in detail below.

Figure 2:
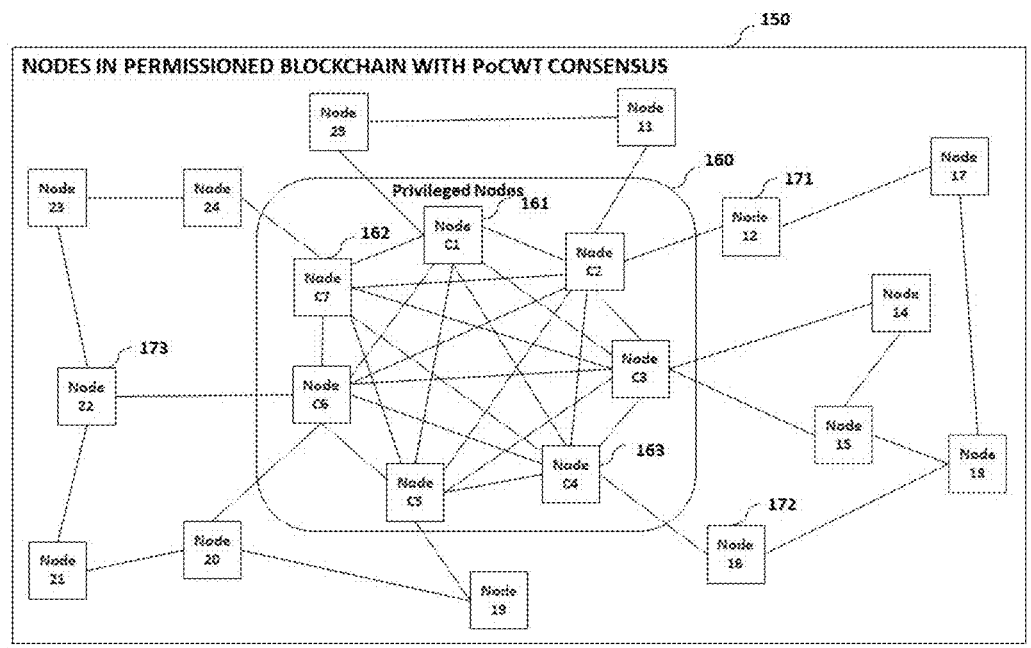
FIG. 2 illustrates an exemplary permissioned blockchain network showing a set of privileged nodes taking part in consensus, in accordance with one embodiment of the present disclosure.

FIG. 2 illustrates an exemplary permissioned blockchain network 150 showing a set of privileged nodes taking part in consensus, in accordance with one embodiment of the present disclosure. Referring to FIG. 2, a subset of nodes 161, 162, 163 and so on in this blockchain network form the set of privileged nodes 160. The privileged nodes 161, 162, 163 may participate in a consensus method for creating and appending new blocks to blockchain. Further, the remaining normal peer nodes 171, 172, 173 and so on as shown in FIG. 2, may participate in validation of transactions and blocks and may store a copy of the blockchain.

Figure 3:
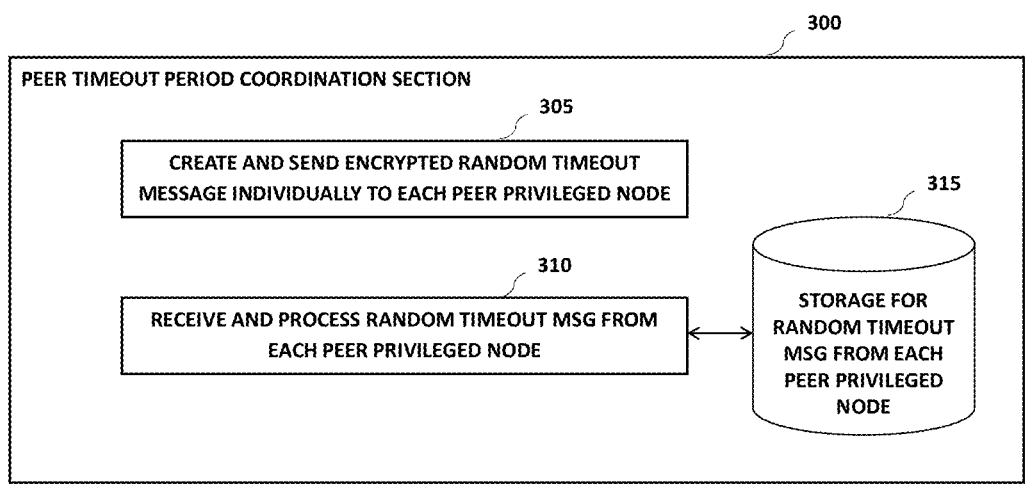
FIG. 3 illustrates a method implemented for peer coordination by the privileged nodes in the permissioned blockchain network, for computation of a timeout value for creating a new block; in accordance with one embodiment of the present disclosure.

FIG. 3 illustrates a method 300 implemented for peer coordination by the privileged nodes in the permissioned blockchain network, for computation of a timeout value for creating a new block, in accordance with one embodiment of the present disclosure. FIG. 3 illustrates the steps performed by the peer timeout value coordination section 125 of FIG. 1. Referring to FIG. 3, the step 305 for creating and sending signed and encrypted random timeout messages by each privileged node, individually to each peer privileged nodes is shown. The step 305 is executed, when a block is appended to the blockchain. The peer timeout value coordination section also includes a procedure to process random timeout message from each peer privileged node as shown by step 310 and a storage 315 to store the peer random timeout messages.

Figure 4:
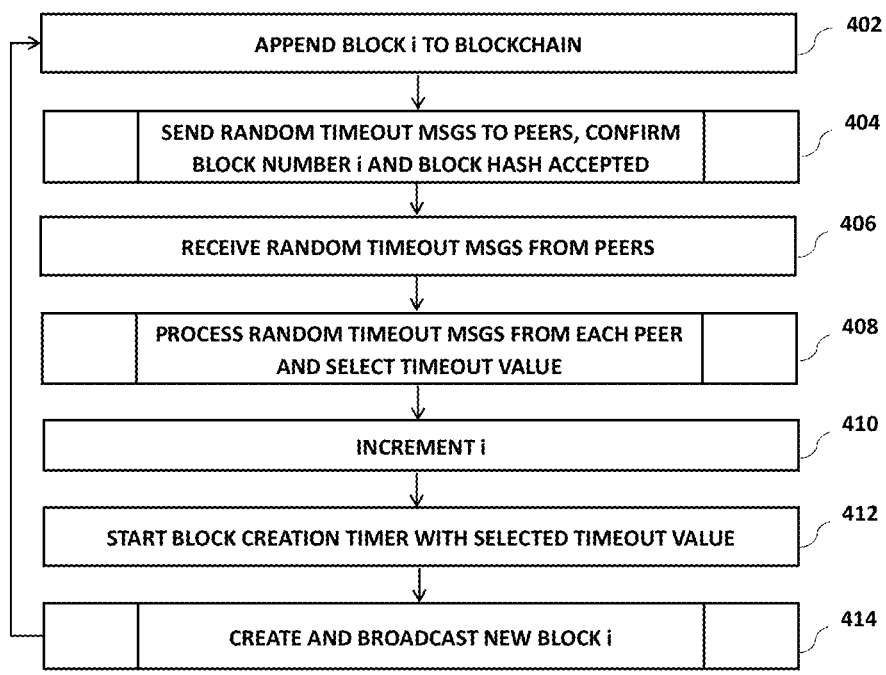
FIG. 4 illustrates a method implemented for block creation cycle in a permissioned blockchain network, in accordance with one embodiment of the present disclosure.

FIG. 4 illustrates an exemplary method 400 implemented for block creation cycle in a permissioned blockchain network, in accordance with one embodiment of the present disclosure. The steps for block creation cycle are performed by privileged nodes of the permissioned blockchain network. A privileged node is selected from the group of privileged nodes and is configured for creating the block and appending the block to the blockchain. The steps performed by the nodes for creating the block and appending the block to the blockchain are explained in detail below.

Referring to FIG. 4, the method 400 illustrates an example of a new block creation by a node "m". In one example, let the starting of a new block creation cycle begin when a block numbered "i" is appended to the blockchain at step 402 by node "m", the block "i" having been either created by node "m" or by some other node in the permissioned blockchain network.

At step 404, node "m" sends a random timeout message that contains the block number and block hash of the most recent block accepted and appended to the blockchain, to each of the peer privileged nodes. The block number and block hash values together with the message header comprising source and destination identifiers is signed with ECDSA (Elliptic Curve Digital Signature Algorithm) private key of node "m" and encrypted with symmetric key shared between node "m" and respective peer privileged node.

The random timeout message is sent by each of the peer privileged nodes to all the peer privileged nodes that are active and authorized to be part of consensus procedure in the permissioned blockchain network. The random timeout message from node "m" also signifies that node "m" has accepted block "i". In one example, if there are "N" privileged nodes in the permissioned blockchain network, the total number of random timeout messages exchanged would be (N (N−1)) for one block creation cycle.

At step 406, the node "m" receives random timeout messages from its peer privileged nodes. Each of the privileged nodes are expected to receive a maximum of (N−1) random timeout messages.

At step 408, the node "m" processes the received random timeout message that includes computation of a random timeout value and random nonce. If random timeout messages are received from at least two-thirds of total privileged nodes, then a timeout value is selected by node "m" from the computed set of 2-tuples, comprising a random timeout value and random nonce. Receiving two-thirds random timeout messages also implies that two-thirds of the privileged nodes in the permissioned blockchain network have accepted block "i".

The current block number "i" is incremented at step 410 and block creation timer is started with the selected timeout value at step 412. If node "m" has the least timeout value among all the other privileged nodes, then block creation timer of node "m" expires first and the procedure to create and broadcast new block is executed at step 414. After the new block has been broadcasted, the block "i" is appended to blockchain by node "m" at step 402 and the next block creation cycle begins.

Figure 5:
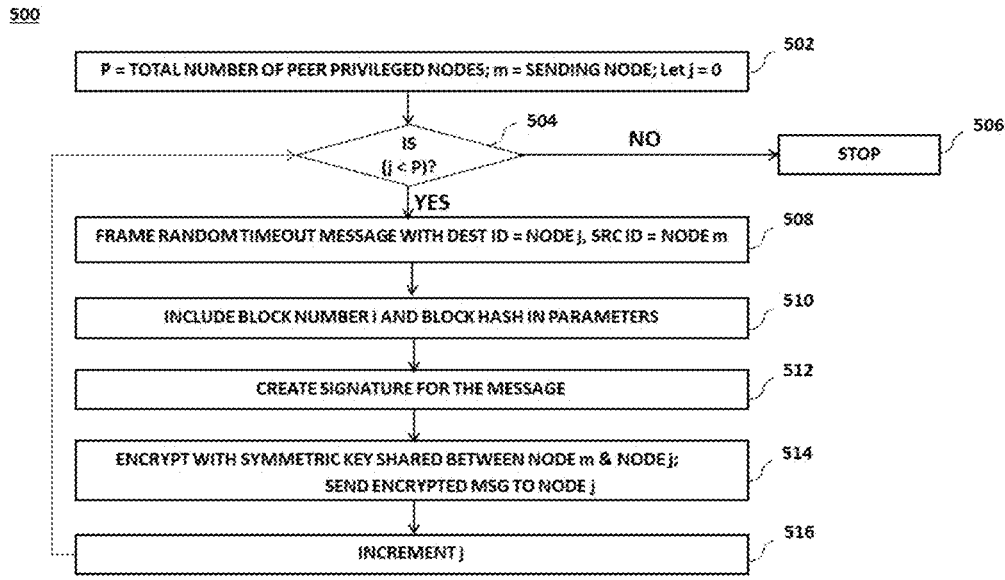
FIG. 5 illustrates a method implemented for sending random timeout period messages by a privileged node to each of the peer privileged nodes in the permissioned blockchain network, in accordance with one embodiment of the present disclosure.

FIG. 5 illustrates a method 500 implemented for sending random timeout period messages by a privileged node to each of the peer privileged nodes in the permissioned blockchain network, in accordance with one embodiment of the present disclosure. Referring to FIG. 5, the method 500 illustrates the steps performed by nodes, to send random timeout messages to each other peer privileged node after appending a block "i" to its copy of blockchain.

The step 502 provides a scenario where it is assumed that, "P" be the total number of peer privileged nodes of node "m". Starting with "j"=0 as the loop variable to loop through all the peer privileged nodes, for each value of "j" that is smaller than "P" at step 504, with "j" representing a different peer privileged node, the following steps are carried out.

At step 508, the random timeout message is created for the peer privileged node, with "j" as destination node id and source id as node "m". At step 510, the block number and block hash of block "i" are included as parameters in the random timeout message. The message is digitally signed by node "m" with its ECDSA private key at step 512. At step 514, the signed message is encrypted with symmetric key shared between node "m" and node "j". The encrypted message is then sent to node "j". At step 516, "j" is incremented to continue the loop. If the random timeout messages have been sent to all the peer privileged nodes, the process stops at step 506.

Figure 6:
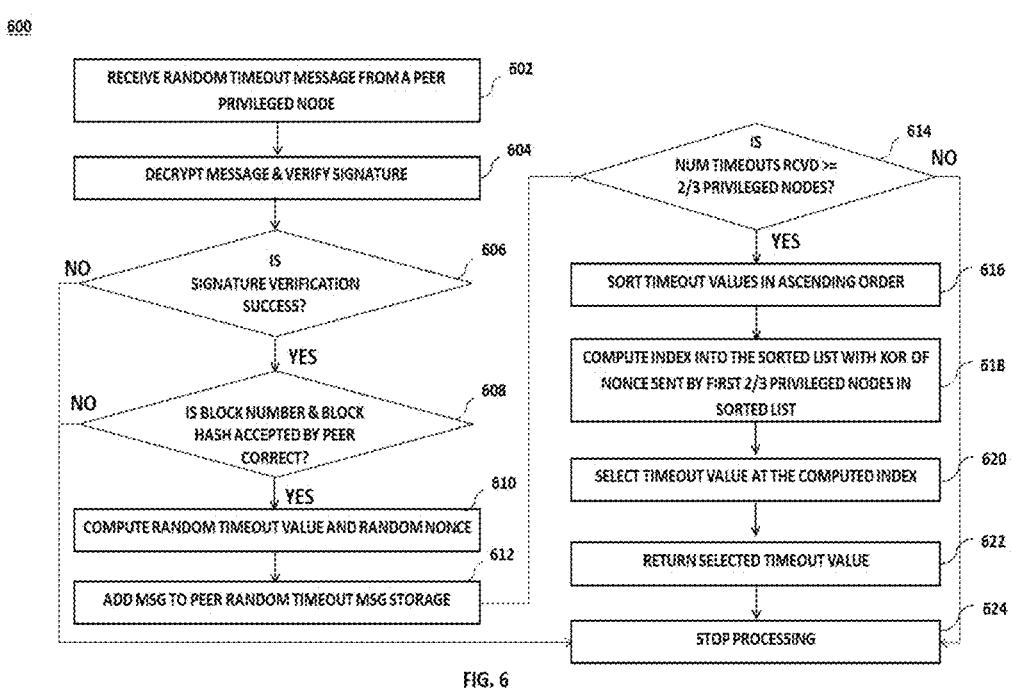
FIG. 6 illustrates a method implemented for receiving and processing the random timeout period message by a privileged node from each of the peer privileged nodes in accordance with one embodiment of the present disclosure.

FIG. 6 illustrates a method 600 implemented for receiving and processing the random timeout message, by a privileged node from each of the peer privileged nodes in accordance with one embodiment of the present disclosure. Referring to FIG. 6, the method 600 illustrates the steps performed by each privileged node for receiving and processing the random timeout period messages from each of the other privileged nodes.

At step 602, the random timeout message is received by node "n" from a peer privileged node "j". At step 604, the message is decrypted by node "n" using the symmetric key shared between node "n" and node "j". Then the decrypted message signature verification is done by node "n".

If the signature verification is determined to have failed at step 606, then the processing stops at step 624. If the signature verification is determined to be successful at step 606, then the block number and block hash accepted by the peer privileged node "j" is verified. If this is determined to be the same as the block number and block hash accepted by node "n" at step 608, then node "n" performs the computation of random timeout value and random nonce at step 610 as described below.

At step 608, if the block number and block hash accepted by the peer privileged node "j" is not the same as the block number and block hash accepted by node "n", then the processing stops at step 624.

A random timeout value is computed at step 610 in a pre-fixed range '$T_R$' in milliseconds with a granularity 'g' of ten milliseconds (10 ms) in this embodiment. In this embodiment, the pre-fixed range for random timeout value is 2000 ms to 10,000 ms. A random nonce is computed with a pre-fixed length of 4-bytes in this embodiment. The detailed steps to compute the random timeout and random nonce are as follows.

Let 'S' be the digital signature of the received random timeout message. A 32-byte hash of 'S' is computed as the first step, using SHA256 hash function in this embodiment.

$$H_S = \text{SHA256\_Hash}(S)$$

$H_S$ is 32 bytes in length and is split into two halves of 16 bytes each. Let the first half be denoted by $H1_S$ and second half by $H2_S$ $$H1_S = H_S[0] \ldots H_S[15]$$

$$H2_S = H_S[16] \ldots H_S[31]$$

$$Q_S = H1_S \oplus H2_S$$

$Q_S$ is 16 bytes in length and is split into two halves of 8 bytes each. Let $Q1_S$ and $Q2_S$ be the first half and second half of $Q_S$ respectively.

$$Q1_S = Q_S[0] \ldots Q_S[7]$$

$$Q2_S = Q_S[8] \ldots Q_S[15]$$

$$R_S = Q1_S \oplus Q2_S$$

$R_S$ is 8 bytes in length. The first half is used for computing the timeout value and the second half is used as nonce.

$$T = R_S[0] \ldots R_S[3]$$

$$\text{Nonce}, N_j = R_S[4] \ldots R_S[7]$$

Let $T_{Min}$ be the minimum timeout value in the pre-fixed range.

$$\text{Random timeout value}, T_j = T_{Min} + (T \bmod (T_R/g))$$

Here, $T_j$ and $N_j$ corresponds to the random timeout value and random nonce computed by node "n" from random timeout message received from a peer privileged node "j". $T_j$ and $N_j$ are added to the set of 2-tuples by node "n".

If the range of the timeout value is less and number of nodes are more, there is likely to be frequent collisions in the timeout value leading to contention resolution procedures. This may cause a load on the network. To select an optimal range '$T_R$' of timeout value, for tolerating a probability 'p' of collision of timeout value between any two privileged nodes and with '$P_N$' privileged nodes in the network, the following approximation from the birthday attack problem can be used:

$$T_R \approx \frac{g P_N^2}{2 \ln \frac{1}{(1-p)}}$$

Or for small values of 'p' (<0.1), $$T_R \approx \frac{gP_N^2}{2p}$$

Then the random timeout message is added to the storage 315 (FIG. 3) at step 612.

If "P" is the total number of peer privileged nodes of node "n", let "k" be equal to ⅔ privileged nodes.

$$k = \frac{2}{3}P$$

If the number of 2-tuples in the set is less than "k", processing stops at step 624. If the number of 2-tuples in the set is greater than or equal to "k" at step 614, at step 616, the 2-tuples are sorted in ascending order of random timeout values and the 2-tuples corresponding to first "k" nodes with least timeout values are considered. Let the random timeout value and random nonce in the sorted 2-tuple set be represented as $T_i$ and $N_i$ for i=0 to k. The sorted 2-tuple set of size "k" is represented as:

$$S = \{(T_1,N_1),(T_2,N_2),(T_3,N_3) \ldots (T_k,N_k)\}$$

At step 618, an index into the sorted 2-tuple set is computed as follows:

$$N \equiv (N_0 \oplus N_1 \oplus N_2 \oplus \ldots \oplus N_k)(\bmod k)$$

Index, $I = |N|$

At step 620, the timeout value is selected for node "n" at index "I" computed in step 618 in the sorted set of 2-tuples. This completes the processing and selecting the timeout values from the set of 2-tuples and the selected timeout value is returned to the caller at step 622 to start the block creation timer. Thereafter, the processing stops at step 624.

Figure 7:
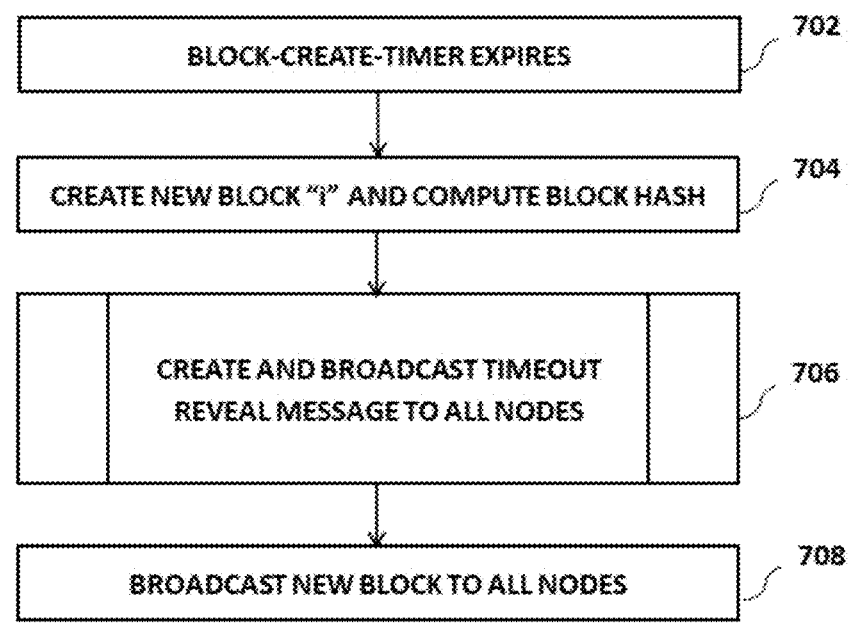
FIG. 7 illustrates a method implemented for creating and broadcasting a new block by a privileged node from each of the peer privileged nodes, in accordance with one embodiment of the present disclosure.

FIG. 7 illustrates a method 700 implemented for creating and broadcasting a new block by a privileged node 'm' from each of the peer privileged nodes, in accordance with one embodiment of the present disclosure. Referring to FIG. 7, the method 700 illustrates the steps performed by nodes in the permissioned blockchain network, for creating and broadcasting a new block. The steps to be performed by nodes for creating and broadcasting a new block starts when the block creation timer expires at step 702 in node "m".

A new block "i" is created at step 704 that includes pending transactions to be committed in a block. A cryptographic hash of the block is computed.

Then at step 706, a timeout reveal message is created that includes all the random timeout messages received from peer privileged nodes of node 'm". The timeout reveal message also includes the block number and block hash computed for the new block. This message is then digitally signed with ECDSA private key of node "m" and broadcasted to all nodes Immediately following this, the block "i" that has been created is broadcasted to all the nodes at step 708.

Figure 8:
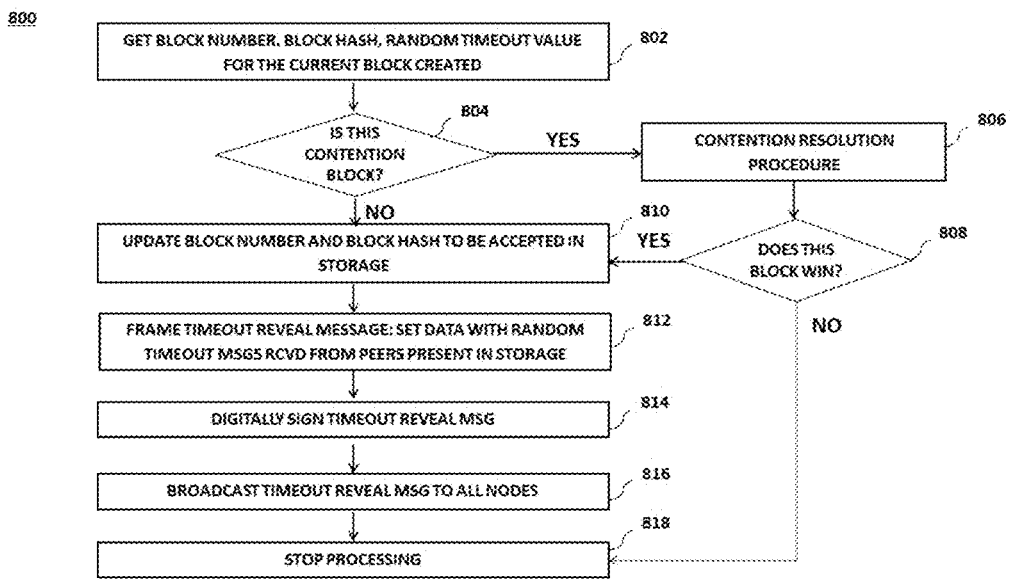
FIG. 8 illustrates a method implemented for creating and broadcasting timeout reveal message by the privileged node creating a new block, in accordance with one embodiment of the present disclosure.

FIG. 8 illustrates a method 800 implemented for creating and broadcasting timeout reveal message by the privileged node creating a new block, in accordance with one embodiment of the present disclosure. Referring to FIG. 8, the method 800 illustrates the steps performed by the privileged node creating a new block, for creating and broadcasting timeout reveal message to all the nodes.

The steps to be performed by nodes for creating and broadcasting timeout reveal message to all the nodes starts after the block creation timer expires and a new block "i" is created by node "m".

At step 802, the block number, block hash and random timeout value of block "i" created, are obtained. Using the block number, it is determined if block "i" is a contention block at step 804. If block "i" is a contention block, then contention resolution procedure is executed at step 806. If block "i" is determined to be not a contention block at step 804 or if block "i" wins the contention resolution procedure at step 808, then the block number and block hash to be accepted for block "i" is updated in the storage 130 (FIG. 1) at step 810. If block "i" does not win the contention at step 808 then processing stops at step 818.

At step 812, a timeout reveal message is framed by node "m" with data containing all the random timeout messages from all the peer privileged nodes of node "m" that was used to compute the random timeout value by node "m" for the current block "i". The random timeout messages that is retrieved from storage 315 will be in plain text (decrypted) and will contain the digital signature of the respective peer privileged node that sent this message to node "m". At step 814, node "m" digitally signs the timeout reveal message with its ECDSA private key and broadcasts the timeout reveal message to all the nodes at step 816. Then the processing stops at step 818.

It is possible that block creation timer of two nodes for example, "m" and "l" can timeout at the same time or at nearly the same time, such that neither timeout reveal message nor the new block from either of the nodes has been received by the other before either of the nodes send the timeout reveal message. It is also possible that block creation timer of one node can expire after receiving the timeout reveal message from the other node, but before receiving the subsequent block. It is also possible that one of the nodes having a shorter timeout value times out after the other node has timed out since they started the timers at slightly different times. All these and other such cases lead to contention of blocks, implying that both are candidate blocks for the next block to be appended in the blockchain, but there needs to be a procedure to determine which of these candidate blocks must be considered as a valid block to be appended to the blockchain. In this embodiment, a contention block is accepted up to 1 second from the time a block "i" is received and appended to blockchain. This contention block might either get rejected or can replace block "i", based on the contention resolution procedure 110 depicted in FIG. 1. The details of the procedure are explained later in this disclosure.

It is to be noted that contention as described herein is also commonly known as a fork in the blockchain. So, contention resolution is equivalent to fork resolution. Since there is a resolution before the next block is appended, in this embodiment, the method provides block finality one second (1 s) after the time at which block "i" is received". It has to be noted here that block finality means an assurance that the block is not going to be replaced and hence, the transactions confirmed in the block can be acted upon.

Figure 9:
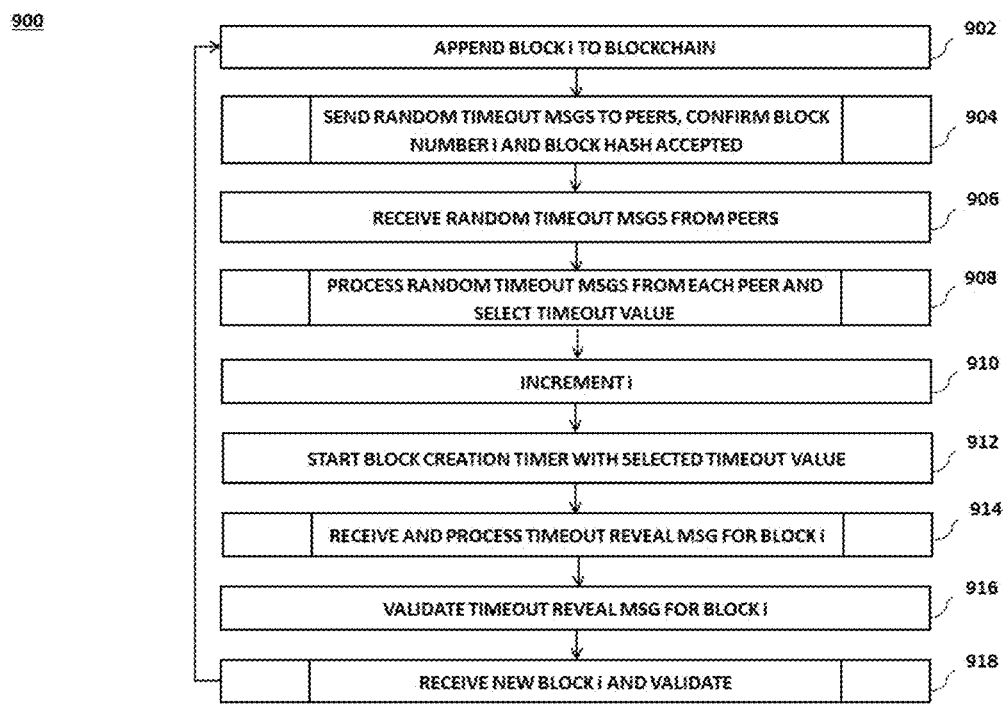
FIG. 9 illustrates a method implemented for block receiving cycle and appending the block to blockchain by the nodes receiving the block, in accordance with one embodiment of the present disclosure.

FIG. 9 illustrates a method 900 implemented for block receiving cycle and appending the block to blockchain by the nodes receiving the block, in accordance with one embodiment of the present disclosure. Referring to FIG. 9, the method 900 illustrates the steps performed to receive a new block "i" by a node "n" and append to its copy of blockchain.

Let the starting of a new block receiving cycle begin at step 902 when a block numbered "i" is appended to the blockchain by node "n", the block "i" having been either created by node "n" or by some other node in the permissioned blockchain network. At step 904, node "n" sends a random timeout message that contains the block number and block hash of the most recent block accepted and appended to the blockchain, to each of the peer privileged nodes. The block number and block hash values together with the message header comprising source and destination identifiers is signed with ECDSA private key of node "n" and encrypted with symmetric key shared between node "n" and respective peer privileged node.

The random timeout message is sent by each of the peer privileged nodes to all the peer privileged nodes that are active and authorized to be part of consensus procedure in the permissioned blockchain network. The random timeout message from node "n" also signifies that node "n" has accepted block "i".

If there are "N" privileged nodes in the permissioned blockchain network, the total number of random timeout messages exchanged would be (N (N−1)) for one block creation cycle.

At step 906, node "n" receives random timeout messages from its peer privileged nodes. Each of the privileged nodes are expected to receive a maximum of (N−1) random timeout messages.

At step 908, node "n" processes the received random timeout message that includes computation of a random timeout value and random nonce. If random timeout messages are received from two-thirds of total privileged nodes, then a timeout value is selected by node "n" from the computed set of 2-tuples, comprising a random timeout value and random nonce. Receiving two-thirds random timeout messages also implies that two-thirds of the privileged nodes in the permissioned blockchain network have accepted block "i".

The current block number "i" is incremented at step 910 and block creation timer is started with the selected timeout value at step 912. If node "n" does not have the least timeout value among all the privileged nodes, then block creation timer of node "n" does not expire first. If block creation timer of node "m" expires first, then block "n" receives, and processes timeout reveal message from node "m" for block "i" at step 914.

Node "n" will validate the received timeout reveal message at step 916. At step 918, node "n" will receive block "i" and if the validation of the received block is successful, it is accepted and appended to blockchain by node "n" at step 902. The next block creation cycle begins. The block validation steps include, but not limited to validation of individual transactions, block format validation, digital signature verification etc. The block acceptance or rejection logic is dependent on the blockchain framework implementation and the fields present in the block header. So, this is not discussed in this disclosure.

Figure 10:
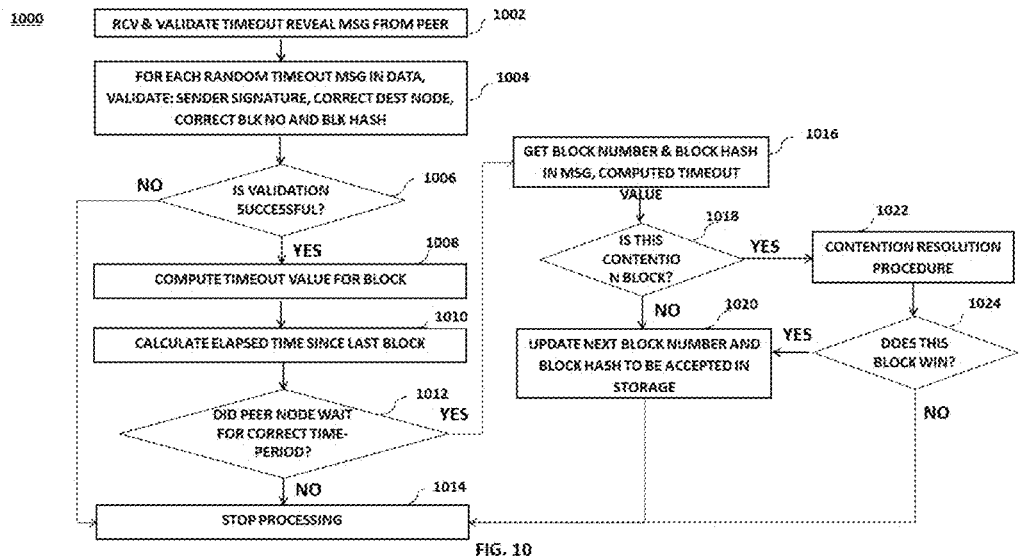
FIG. 10 illustrates a method implemented for receiving and validating the timeout reveal message by nodes receiving the block, in accordance with one embodiment of the present disclosure.

FIG. 10 illustrates a method 1000 implemented for receiving and validating the timeout reveal message by nodes receiving the block, in accordance with one embodiment of the present disclosure. Referring to FIG. 10, the method 1000 illustrates the steps performed to receive and process the timeout reveal message for block "i" from node "m" by node "n" is shown.

At step 1002, the timeout reveal message is received by node "n" and the authenticity and integrity of the message is verified using the digital signature present in the message and ECDSA public key of node "m". At step 1004, for each random timeout message that is part of data section of the timeout reveal message, sender's signature is verified along with correctness of destination node, block number and block hash. If the validation result of step 1004 is determined to be successful at step 1006, then the timeout value for the block "i" is computed by node "n" at step 1008, the method of computing the timeout value being the same as that computed by node "m" for starting the block creation timer.

If the validation result of step 1004 is determined to have failed, then the processing stops at step 1014 and the timeout reveal message and the subsequent block "i" from node "m" will be ignored.

Then at step 1010, node "n" computes the elapsed time since the last block was created and at step 1012 validates whether node "m" waited for the correct timeout value before sending block "i". If the validation is successful, then at step 1016, the block number and block hash present in the timeout reveal message and computed random timeout value of block "i" are obtained. Using the block number, at step 1018, it is determined if block "i" is a contention block. If it is a contention block, the contention resolution procedure is executed at step 1022. If block "i" is not a contention block or if this block wins the contention resolution procedure at step 1024, then the block number and block hash to be accepted for block "i" is updated in the storage 130 at step 1020. Thereafter the processing stops at step 1014. If block "i" does not win the contention resolution procedure at step 1024, node "n" will not accept the block "i" received subsequently and the processing stops at step 1014.

Figure 11:
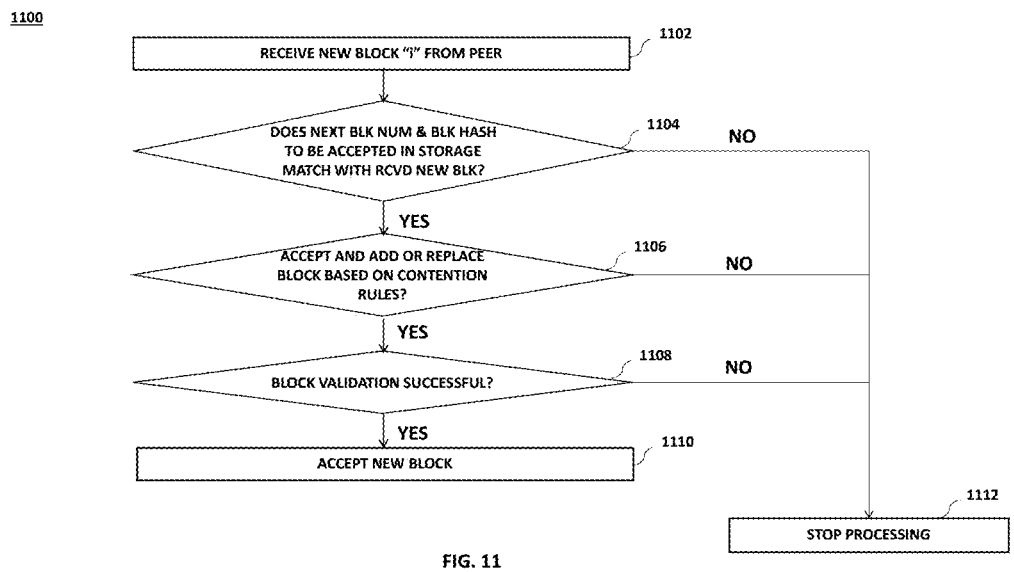
FIG. 11 illustrates a method implemented for receiving and validating a new block, in accordance with one embodiment of the present disclosure.

FIG. 11 illustrates a method 1100 implemented for receiving and validating a new block, in accordance with one embodiment of the present disclosure. Referring to FIG. 11, the method 1100 illustrates the steps performed to receive and validate a new block "i" by node "n" is shown.

When a new block "i" is received from a peer privileged node "m" at step 1102, then at step 1104, the block number and block hash of the block "i" received is matched with the values stored in storage 130 when a previous timeout reveal message for block "i" was successfully processed. The block "i" received will be rejected if there is no match and the processing will stop at step 1112.

If the matching is successful at step 1104, then at step 1106, the result of the contention resolution procedure is checked when timeout reveal message was processed.

If the contention resolution outcome is to reject or ignore the block, then the received block "i" is ignored and processing stops at step 1112. If the contention resolution outcome is to accept the block, the received block "i" is subjected to block validation in step 1108. If the block validation is not successful, then block "i" is rejected and processing stops at step 1112. If block validation is successful, then block "i" is accepted at step 1110 and either directly appended to the blockchain or an existing block is replaced with block "i" based on contention resolution outcome when timeout reveal message was processed.

Figures 12, 13:
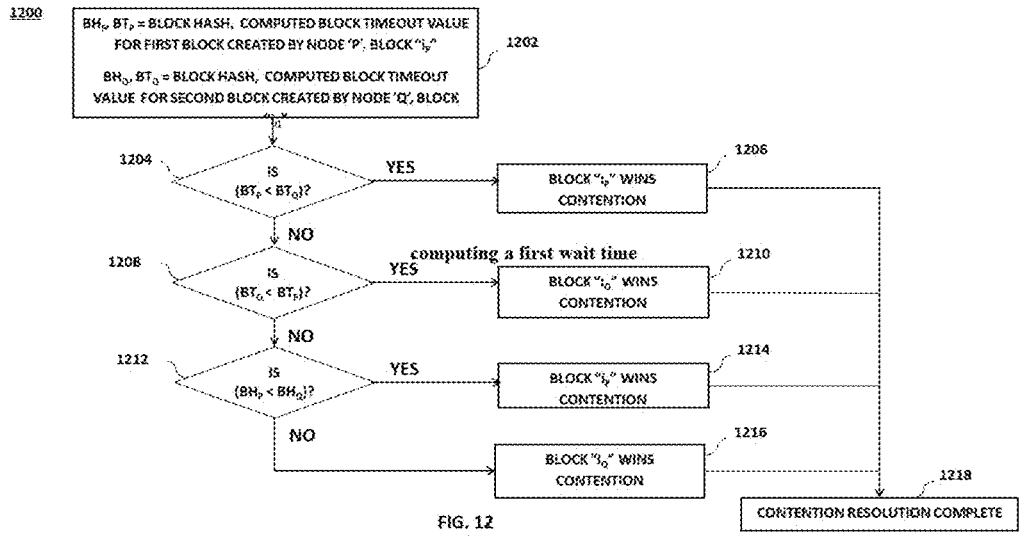
FIG. 12 illustrates a method implemented for contention resolution, in accordance with one embodiment of the present disclosure.
FIG. 13 illustrates an example scenario showing privileged nodes N1, N2, N3, N4, N . . . Nn) and plurality of first messages ((N1-2, N1-3, N1- . . . N1-$n$), (N2-1, N2-3, N2- . . . N2-$n$), . . . (Nn-1, Nn-2, Nn- . . . Nn-($n$–1))), in accordance with one embodiment of the present disclosure.

FIG. 12 illustrates a method 1200 implemented for contention resolution, in accordance with one embodiment of the present disclosure. Referring to FIG. 12, the method 1200 illustrates the steps performed for the contention resolution.

At step 1202, let $BH_P$, $BT_P$ be the block hash and block timeout values respectively for the first contention block created by node P. Let this block be denoted as "$i_P$". Further, let $BH_Q$, $BT_Q$ be the block hash and block timeout values respectively for the second contention block created by node Q. Let this block be denoted as "$i_Q$".

At step 1204, if the value of $BT_P$ is determined to be less than $BT_Q$, then the first block "$i_P$" wins the contention at step 1206 since the absolute timeout value that was computed with peer coordination is less than the timeout value computed for the second block "$i_Q$". Then the contention resolution is complete at step 1218. Block appended to the blockchain, block "i"=block "$i_P$", if ($BT_P<BT_Q$)

If the outcome of comparison at step 1204 is false, then at step 1208, if the value of $BT_Q$ is less than $BT_P$, then the second block $i_Q$ wins the contention at step 1210 since the absolute timeout value that was computed with peer coordination is less than the timeout value computed for the first block $i_P$. Block appended to the blockchain, block "i"=block "$i_Q$", if ($BT_Q<BT_P$)

If the outcome at step 1208 is false, then it implies that both $BT_P$ and $BT_Q$ values are same. Then the hash associated with the blocks are used to resolve the contention. At step 1212, if $BH_P$ is less than $BH_Q$, then the first block $i_P$ wins the contention at step 1214, otherwise the second block $i_Q$ wins the contention at step 1216. The case where $BH_P$ is equal to $BH_Q$ is not considered since cryptographic hash algorithms are designed to be collision resistant and for all practical purposes, it is safe to assume that hashes of any two blocks would be different. Block appended to the blockchain, block "i"=block "$i_P$", if ($BT_P==BT_Q$) && ($BH_P<BH_Q$). Block appended to the blockchain, block "i"=block "$i_Q$", if ($BT_Q==BT_P$) && ($BH_Q<BH_P$). Then the contention resolution is complete at step 1218.

FIG. 13 illustrates an example scenario 1300 showing privileged nodes N1, N2, N3, N4, N . . . Nn and plurality of first messages ((N1-2, N1-3, N1- . . . N1-$n$), (N2-1, N2-3, N2- . . . N2-$n$), . . . (Nn-1, Nn-2, Nn- . . . Nn-(n−1))), in accordance with one embodiment of the present disclosure. As explained above in FIG. 2, the privileged nodes are the set of nodes of the permissioned blockchain network taking part in consensus. The privileged nodes N1, N2, N3, N4, N . . . Nn participate in the consensus method for creating and appending new blocks to blockchain. As explained above in FIG. 5, each of the privileged nodes of the permissioned blockchain sends a plurality of random timeout message (first messages), individually to each of the other privileged nodes of the plurality of privileged nodes.

Referring to FIG. 13, the first message sent by the privileged node N1 to all the other privileged nodes in the permissioned network is shown by N1-2, N1-3, N1- . . . N1-$n$. The first message sent by the privileged node N2 to all the other privileged nodes in the permissioned network is shown by (N2-1, N2-3, N2- . . . N2-$n$). The first message sent by the privileged node Nn to all the other privileged nodes in the permissioned network is shown by Nn-1, Nn-2, Nn- . . . Nn-(n−1))). Each node is configured to send first message individually to each of the other privileged nodes of the plurality of privileged nodes of the permissioned blockchain network.

Figure 14:
FIG. 14 illustrates an example scenario showing timers T1, T2, T3, T4, T . . . , Tn for each of the privileged nodes N1, N2, N3, N4, N . . . , Nn and a timeout reveal message TORM broadcast by the privileged node N2, whose timer T2 times out before the timers T1, T3, T4, T . . . , Tn of the other privileged nodes time out, in accordance with one embodiment of the present disclosure.
Figure 14:
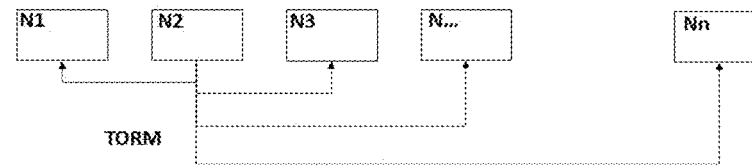

FIG. 14 illustrates an example scenario 1400 showing timers T1, T2, T3, T4, T . . . , Tn for each of the privileged nodes N1, N2, N3, N4, N . . . , Nn and a timeout reveal message TORM broadcasted by the privileged node N2, whose timer T2 times out before the timers T1, T3, T4, T . . . , Tn of the other privileged nodes, in accordance with one embodiment of the present disclosure.

The timers T1, T2, T3, T4, T . . . , Tn are the block creation timers. Each timer is set to the computed first wait time WT1, WT2, WT3, WT4, WT . . . , WTn and initiated. The computation of first wait time is explained in detail above in FIG. 6. For the purposes of description, it is assumed here that the timer T2, set to a first wait time of WT2, of the node N2 has the smallest of first wait times among all wait times and hence times out before the other timers time out. Exemplarily, since the timer T2 of the privileged node N2 times out before the timers T1, T3, T4, T . . . , Tn of the other privileged nodes N1, N3, N4, N . . . , Nn, the privileged node N2 creates the new block for appending to the permissioned blockchain. The below flow chart is explained considering the example scenarios as depicted in FIG. 13 and FIG. 14.

Figure 15:
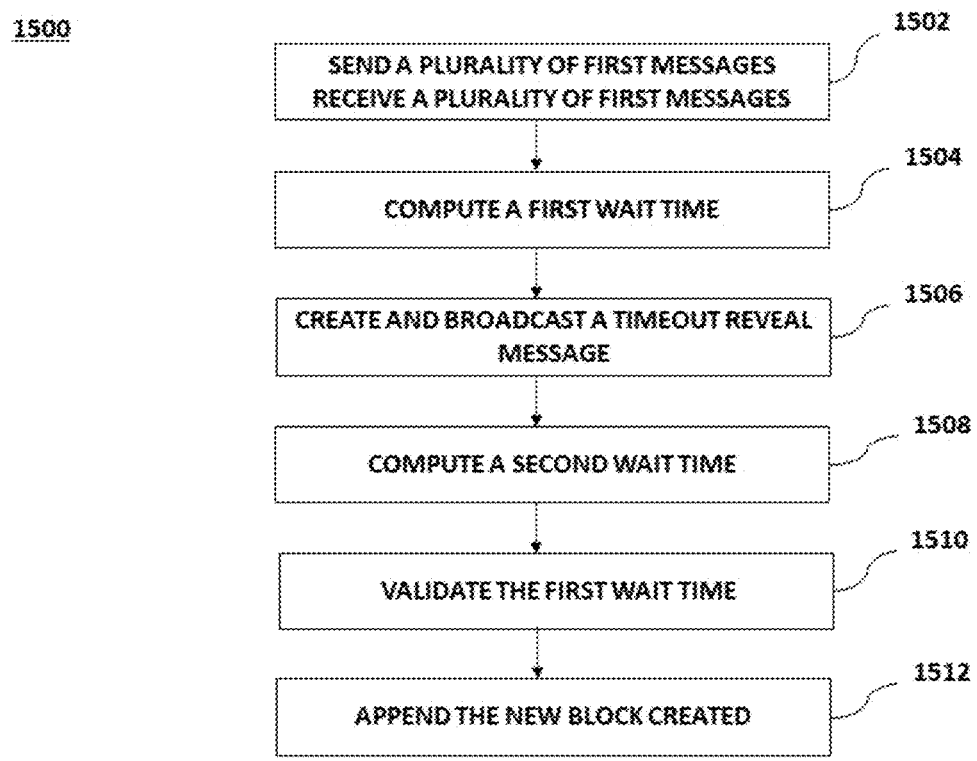
FIG. 15 is a flow chart illustrating a method for appending a new block to a blockchain in a permissioned network, in accordance with one embodiment of the present disclosure.

FIG. 15 is a flow chart illustrating a method 1500 for appending a new block to a blockchain in a permissioned network, in accordance with one embodiment of the present disclosure. FIG. 15 may be described from the perspective of a processor that is configured to execute computer-readable instructions to carry out the functionalities of the system 100 of FIG. 1. In particular, the steps as described in FIG. 15 may be executed for reaching consensus for appending the new block to the blockchain such that all the nodes in the blockchain network have identical copies of any given block in the blockchain. Each step is described in further detail below.

At step 1502, each of a designated plurality of privileged nodes (N1, N2, N3, N . . . Nn) of the permissioned blockchain sends a plurality of first messages ((N1-2, N1-3, N1- . . . N1-$n$), (N2-1, N2-3, N2- . . . N2-$n$), . . . (Nn-1, Nn-2, Nn- . . . Nn-(n−1))), individually to each of the other privileged nodes of the plurality of privileged nodes. The contents of each of the first messages are calculated using a first predefined method.

The first predefined method for creating each of the first messages comprises the steps of creating a first data packet, signing the first data packet digitally and encrypting the signed first data packet using a predetermined encryption method. The first data packet comprises a block number of a last accepted block, a hash of the last accepted block, a header with an identifier of the privileged node sending the first message and an identifier of the privileged node to which the first message is to be sent.

The steps for calculating a pairs of values for each of the plurality of first messages include creating a 32-byte hash of each of the digital signatures; splitting the 32-byte hash into two equal parts of 16-bytes each; computing the EXOR value of the two parts split equally for obtaining a 16-byte number; splitting the 16-byte number into two equal parts of 8-bytes each; computing the EXOR value of the two parts split equally for obtaining a 8-byte number; computing a random time out value from a first set of 4-bytes; and computing a nonce value from a second set of 4-bytes. The pair of values comprising a time out value and a nonce from each of the first messages received. It has to be noted here that the split has to be in predefined order and not necessarily sequential. However the same predefined manner has to be followed in each of the nodes.

At step 1504, each of the plurality of privileged nodes (N1, N2, N3, N . . . Nn) computing a first wait time (WT1, WT2, WT . . . WTn) based on the plurality of first messages received by each of the plurality of privileged nodes (N1, N2, N3, N . . . Nn), using a second predefined method.

In one embodiment, a timer (T1, T2, T . . . , Tn) which is set to the computed first wait time (WT1, WT2, WT . . . WTn) is initiated. The second predefined method of computing the first wait time (WT1, WT2, WT . . . WTn) comprises the steps of calculating a pair of values comprising a time out value and a nonce from each of the first messages received, arranging the time out values in ascending order of magnitude, calculating an index into the ordered list using all the nonce values calculated, and selecting the value of the time corresponding to the index value as the time out value for the timer.

At step 1506, the privileged node (N2), whose timer times out before the timers of the other privileged nodes, creates the new block for appending to the permissioned blockchain. For creating the new block, a timeout reveal message (TORM) is created and broadcasted to all the other privileged nodes (N1, N3, . . . Nn) by the privileged node (N2).

In one embodiment, the steps for creating the timeout reveal message (TORM) for broadcasting to all the other privileged nodes (N1, N3, . . . Nn) includes creating a second data packet containing a block number of the new block, a block hash of the new block, all the time out messages received by the node (N2) creating the new block and signing the second data packet digitally. The step of creating the timeout reveal message (TORM) for broadcasting to all the other privileged nodes (N1, N3, . . . Nn) starts after the timer of the privileged node (N2) times out and the new block is created.

At step 1508, each of the privileged nodes (N1, N3, . . . Nn) receiving the timeout reveal message (TORM) computes a second wait time using the second predefined method. The second predefined method is explained a step 1504.

At step 1510, the first wait time (WT1, WT2, WT . . . WTn) is validated with the second wait time, by each of the other privileged nodes. The steps for validating the first wait time comprises the steps of comparing the second wait time and a time between the creating of the last block and receiving the timeout reveal message (TORM) and treating the first wait time as validated.

At step 1512, the new block created is appended to its own copy of the block chain, provided the second wait time is substantially the same as the time waited for by the privileged node (N2) that broadcast the timeout reveal message (TORM) after previous block was created.

Figure 16:
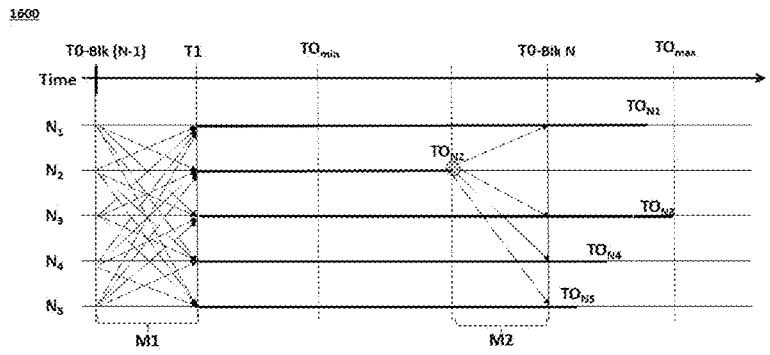
FIG. 16 is a timing diagram that shows the timing of the sequence of events involved in creating a new block for being appended to the blockchain and arriving at the consensus according to this disclosure.
Figure 17:
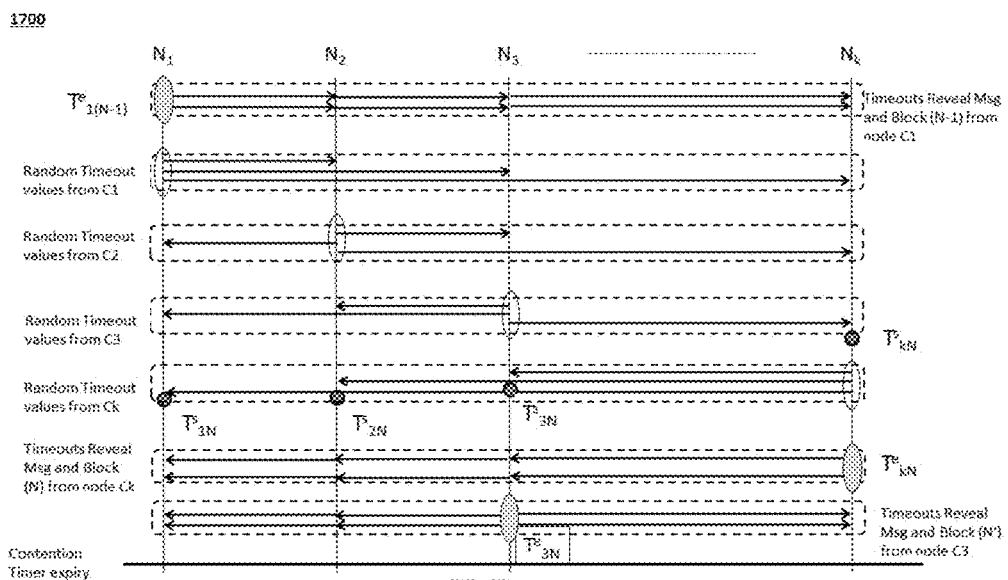
FIG. 17 is a is a sequence diagram that shows the sequence of events involved in creating a new block for being appended to the blockchain and arriving at the consensus according to this disclosure.

FIG. 16 is a timing diagram 1600 that shows the timing of the sequence of events involved in creating a new block for being appended to the blockchain and arriving at the consensus according to this disclosure. and FIG. 17 is a is a sequence diagram 1700 that shows the sequence of events involved in creating a new block for being appended to the blockchain and arriving at the consensus according to this disclosure.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method for appending a new block to a blockchain in a permissioned blockchain, the method comprising the steps of:
   each of a designated plurality of privileged nodes (N1, N2, N3, N . . . Nn) sending a plurality of first messages ((N1-2, N1-3, N1- . . . N1-$n$), (N2-1, N2-3, N2- . . . N2-$n$), . . . (Nn-1, Nn-2, Nn- . . . Nn-($n$−1))), individually to each of the other privileged nodes of the plurality of privileged nodes, wherein contents of each of the first messages are calculated using a first predefined method;
   each of the plurality of privileged nodes (N1, N2, N3, N . . . Nn) computing a first wait time (WT1, WT2, WT . . . WTn) based on the plurality of first messages received by each of the plurality of privileged nodes (N1, N2, N3, N . . . Nn), using a second predefined method; wherein initiating a timer (T1, T2, T . . . , Tn) for computing the first wait time (WT1, WT2, WT . . . WTn);
   the privileged node (N2), whose timer times out before the timers of the other privileged nodes, creating the new block for appending to the permissioned blockchain, creating and broadcasting a timeout reveal message (TORM) to all the other privileged nodes (N1, N3, . . . Nn);
   each of the privileged nodes (N1, N3, . . . Nn) receiving the timeout reveal message (TORM) computing a second wait time using the second predefined method;
   validating the first wait time (WT1, WT2, WT . . . WTn) with the second wait time, by each of the other privileged nodes; and
   appending the new block created to its own copy of the block chain, provided the second wait time is substantially the same as the time waited for by the privileged node (N2) that broadcast the timeout reveal message (TORM) after previous block was created.

2. The method of claim 1 wherein the first predefined method for creating each of the first messages comprises the steps of:
   creating a first data packet comprising:
      a block number of a last accepted block;
      a hash of the last accepted block;
      a header with an identifier of the privileged node sending the first message;
      an identifier of the privileged node to which the first message is to be sent;
   signing the first data packet digitally with a digital signature; and
   encrypting the signed first data packet using a predetermined encryption method.

3. The method of claim 1 wherein the second predefined method of computing the first wait time (WT1, WT2, WT . . . WTn) and the second wait time comprises the steps of:
   calculating a pair of values comprising a time out value and a nonce from each of the first messages received;
   arranging the time out values in ascending order of magnitude;
   calculating an index into an ordered list using all the nonce values calculated; and
   selecting the value of the time corresponding to the index value as the time out value for the timer.

4. The method of claim 3 wherein calculating for each of the plurality of first messages the pairs of values comprise:

creating a 32-byte hash of each of the digital signatures;
splitting the 32-byte hash into two equal parts of 16-bytes each;
computing an EXOR value of the two equal parts for obtaining a 16-byte number;
splitting the 16-byte number into two equal parts of 8-bytes each;
computing an EXOR value of the two equal parts for obtaining an 8-byte number;
computing a random time out value from a first set of 4-bytes of the 8 byte number; and
computing a nonce value from a second set of 4-bytes of the 8-byte number.

5. The method of claim 1 wherein creating the timeout reveal message (TORM) for broadcasting to all the other privileged nodes (N1, N3, . . . Nn) comprises the steps of:
creating a second data packet containing;
a block number of the new block;
a block hash of the new block;
all the time out messages received by the node (N2) creating the new block; and signing the second data packet digitally with a digital signature.

6. The method of claim 5 wherein creating the timeout reveal message (TORM) for broadcasting to all the other privileged nodes (N1, N3, . . . Nn) starts after the timer of the privileged node (N2) times out and the new block is created.

7. The method of claim 1 wherein the method for validating the first wait time comprises the steps of;
comparing the second wait time and a time between the creating of the last block and receiving the timeout reveal message (TORM); and
treating the first wait time as validated.

8. A system of nodes operating a permissioned blockchain, the system configured for appending a new block to the permissioned blockchain by a selected privileged node, out of a plurality of privileged nodes, the selected privileged node being selected through consensus, each of the privileged nodes of the system comprising a processor and a non-transitory computer readable storage medium storing instructions for execution by the processor for achieving consensus through:
each of the designated plurality of privileged nodes (N1, N2, N3, N . . . Nn) of the sending a plurality of first messages ((N1-2, N1-3, N1- . . . N1-$n$), (N2-1, N2-3, N2- . . . N2-$n$), . . . (Nn-1, Nn-2, Nn- . . . Nn-(n−1))), individually to each of the other privileged nodes of the plurality of privileged nodes, wherein contents of each of the first messages are calculated using a first predefined method;
each of the plurality of privileged nodes (N1, N2, N3, N . . . Nn) computing a first wait time (WT1, WT2, WT . . . WTn) based on the plurality of first messages received by each of the plurality of privileged nodes (N1, N2, N3, N . . . Nn), using a second predefined method; wherein initiating a timer (T1, T2, T . . . , Tn) for computing the first wait time (WT1, WT2, WT . . . WTn);
the privileged node (N2), whose timer times out before the timers of the other privileged nodes, creating the new block for appending to the permissioned blockchain, creating and broadcasting a timeout reveal message (TORM) to all the other privileged nodes (N1, N3, . . . Nn);
each of the privileged nodes (N1, N3, . . . Nn) receiving the timeout reveal message (TORM) computing a second wait time using the second predefined method;
validating the first wait time (WT1, WT2, WT . . . WTn) with the second wait time, by each of the other privileged nodes; and
appending, by each privileged node, the new block created, to its copy of the block chain, provided the second wait time is substantially the same as the time waited for by the privileged node (N2) that broadcast the timeout reveal message (TORM) after previous block was created.

9. The system of claim 8 wherein the first predefined method for creating each of the first messages comprises the steps of:
creating a first data packet comprising:
a block number of a last accepted block;
a hash of the last accepted block;
a header with an identifier of the privileged node sending the first message;
an identifier of the privileged node to which the first message is to be sent;
signing the first data packet digitally with a digital signature; and
encrypting the signed first data packet using a predetermined encryption method.

10. The system of claim 8 wherein the second predefined method of computing the first wait time (WT1, WT2, WT . . . WTn) and the second wait time comprises the steps of:
calculating a pair of values comprising a time out value and a nonce from each of the first messages received;
arranging the time out values in ascending order of magnitude;
calculating an index into an ordered list using all the nonce values calculated; and
selecting the value of the time corresponding to the index value as the time out value for the timer.

11. The system of claim 10 wherein calculating for each of the plurality of first messages the pairs of values comprise:
creating a 32-byte hash of each of the digital signatures;
splitting the 32-byte hash into two equal parts of 16 bytes each;
computing an EXOR value of the two equal parts for obtaining a 16-byte number;
splitting the 16-byte number into two equal parts of 8 bytes each;
computing an EXOR value of the two equal parts for obtaining an 8-byte number;
computing a random time out value from a first set of 4 bytes of the 8 byte number; and
computing a nonce value from a second set of 4-bytes of the 8-byte number.

12. The system of claim 8 wherein creating the timeout reveal message (TORM) for broadcasting to all the other privileged nodes (N1, N3, . . . Nn) comprises the steps of:
creating a second data packet containing;
a block number of the new block;
a block hash of the new block;
all the time out messages received by the node (N2) creating the new block; and signing the second data packet digitally with a digital signature.

13. The system of claim 12 wherein creating the timeout reveal message (TORM) for broadcasting to all the other privileged nodes (N1, N3, . . . Nn) starts after the timer of the privileged node (N2) times out and the new block is created.

14. The system of claim 13 wherein the validating the first wait time comprises the steps of;

comparing the second wait time and a time between the creating of the last block and receiving the timeout reveal message (TORM); and
treating the first wait time as validated.

\* \* \* \* \*